United States Patent Office 3,695,932
Patented Oct. 3, 1972

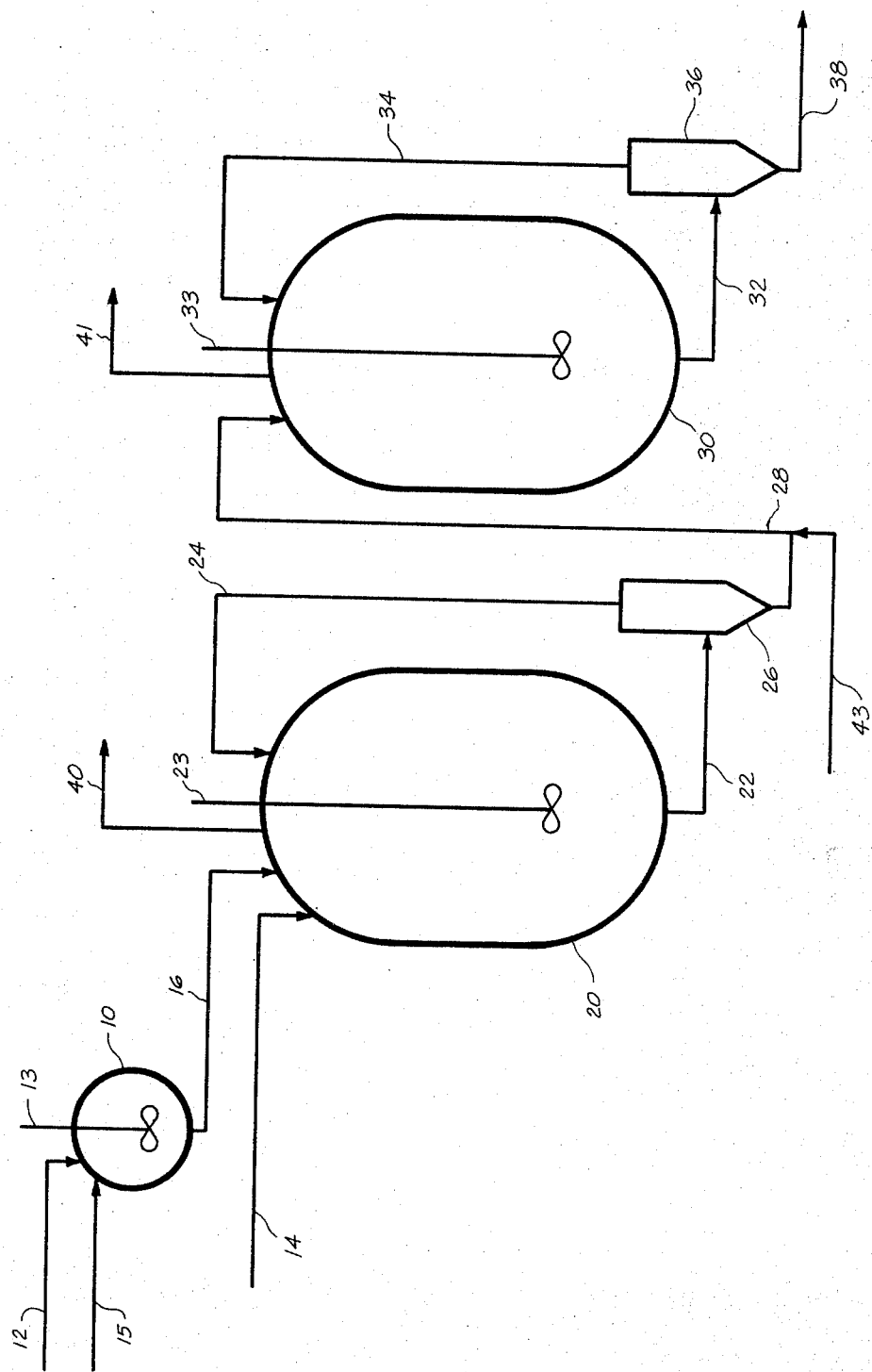

3,695,932
SUCROSE NUCLEATION COMPOSITION AND
METHOD OF PREPARATION
Alan D. Randolph and Rufus W. Crawford, Tucson,
Ariz., assignors to The Battelle Development Corporation, Columbus, Ohio
Filed July 29, 1970, Ser. No. 59,233
Int. Cl. C13f 1/02
U.S. Cl. 127—30
16 Claims

ABSTRACT OF THE DISCLOSURE

A sucrose nucleation composition for crystallizing sucrose comprises sucrose nuclei having at least 90% as single crystals, a crystal population density expressed as particles per cubic centimeter per micron of at least about 10,000 at a crystal size of ten microns, a population-weighted mean size of between about 10 and about 30 microns, and a total number concentration of at least about 100,000 particles per cubic centimeter. The nucleation composition may be produced in batch or continuously, but preferably continuously, by mixing a critical amount of low molecular weight polar organic compound, preferably ethanol and a sucrose feed syrup comprising a major amount of sucrose and water.

BACKGROUND OF THE INVENTION

Sugar (sucrose) is presently produced by batch processing in large quantities. Although semi-continuous or continuous crystallization processes and methods have been suggested and attempted from time to time, none have been apparently commercially successful. A major problem in producing sugar is in attaining a well-formed crystalline product having a relatively narrow crystal size range necessary for commercial or consumer acceptability.

In sugar production processes, the sugar crystals or particles are grown on nuclei or seeds of sucros either added to the sucrose syrup composition or, in some cases, formed spontaneously in the initial phase of a batch crystallization composition. A common method is to grind sugar crystals to form relatively small seed particles which are then added to a vacuum vessel containing the syrup. A typical reactor may be one in which a pound or two of seeds or nuclei are added to about 2,000 pounds of syrup.

When a sugar pan is seeded with seed produced by grinding, growth of perfectly formed sucrose crystals having relatively small amounts of occluded impurities is inherently difficult if not impossible to attain because of the initial shape of the sucrose nuclei or seeds on which the sucrose crystals are grown. It is well understood in the art that the shape and amount of mother liquor occlusions in crystals grown on nuclei are quite dependent on the original shape and processes of formation of the nuclei.

A major concern in producing a desirable crystalline sugar product is in forming seed of uniform shape. Where the nuclei are produced by crushing larger sugar particles, their shape is uncontrollably quite irregular and non-uniform.

The use of irregularly shaped nuclei in processes crystallizing raw sugar increases subsequent refining costs because of impurities trapped in the growing crystals from the raw syrup composition during formation. It will be appreciated that raw syrup composition obtained from the sugar cane or beet juice includes not only sucrose and water but other impurities such as reducing sugars, ash, and organic non-sugar materials. Where initiating crystal seeds or nuclei are irregular, the impurity is not merely a surface adsorption problem. Thus, although the major impurities are recovered as molasses, impurities entrapped as occlusions in the sugar crystals cannot be washed off and are removed only in subsequent extensive and expensive purification steps in the refining process.

Other batch sugar crystallization methods have been proposed using nuclei or seeds grown from the syrup in the early crystallization stages of the process. Suggested methods include addition of large amounts of so called salting-out agents such as acetic acid, ethyl acetate, alkanols, benzene, chloroform, etc. The use of these materials is suggested in large amount, again between about ½ and about 3–4 times the amount of syrup present, in order to salt out the sugar crystals. Again, it should be appreciated that these processes attempt to gain the entire crops of sugar from the salted-out high-organic-concentration syrup. Such high concentrations of solvent in the syrup yield large crop of sugar but provide adverse conditions for the growth of pure well-formed single crystals with low occluded impurities.

Eventual recovery of the agents added to the crystallizing composition is necessary for economic reasons. In some processes temperatures are also varied to aid in the crystallization. However, the nuclei formed rather than being of single crystal habit are instead twinned or multi-crystal varying greatly in size and shape. Thus, the sugar crystals grown on these nuclei are similarly of great size and shape ranges resulting in the same inherent problems and disadvantages as those attendant with the physical seed addition methods described previously.

Continuous sugar processing is economically desirable to reduce large batch equipment and heating requirements. However, practical continuous processing also requires continuous nucleation and compounds the requirement of sugar crystals having a narrow size range.

SUMMARY OF THE INVENTION

We have now found a method of producing highly uniform single crystal sucrose nuclei which may be accomplished in batch or continuously. Because of the substantial amount of the single crystals prepared by this method, the use of the nuclei result in highly improved sugar crystal formation of the relatively uniform crystal shape. The nuclei may be used in continuous or batch operations, either in initial crystallization from raw sucrose syrup or in refining phases. Not only are superior sugar crystals of uniform size and shape attained but processing costs may be considerably reduced because of the relatively small amounts of organic salting-out materials used in this process. Such small amounts of salting-out agents are economically insignificant compared to the value of sucrose produced and need not be recovered. These as well as other advantages will be evident to those skilled in the art from the following detailed description.

BRIEF DESCRIPTION OF THE DRAWINGS

FIG. 3 schematically illustrates a continuous process of the invention.

DETAILED DESCRIPTION OF THE INVENTION

Figure 1:
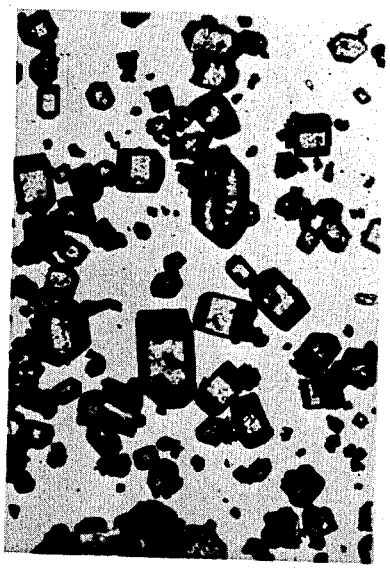
FIG. 1 is a micro-photograph of sucrose nuclei of the invention.

The process by which the sucrose nucleating compositions are prepared comprises mixing a low molecular weight polar organic compound with a concentrated sucrose feed syrup comprising a major amount of sucrose and water. The sucrose syrup may be obtained from beet or cane sugar juice and may contain in addition to sucrose and water the impurities normally present in raw syrup used in sugar crystallization operations. Alternatively, the syrup may be in a more purified state such as that used in recrystallization or sugar refining from which at least the majority of impurities found in the raw syrup have been removed. Regardless of which type of syrup is used, it comprises a major amount of sucrose, i.e., over 50% by weight sucrose and water. Preferably the syrup will comprise 60–80% sucrose and more preferably between about 65 and 70% by weight sucrose with between about 20–40% and more preferably about 30–35% water.

The presence of a low molecular weight polar organic compound is to achieve an environment suitable for growth of the desirable nuclei. The proposed compounds are selected from the group consisting of aliphatic ethers, esters, ketones, aldehydes and alkanols as well as mixtures of these materials. Useful compounds of this type are those containing between one and about eight carbon atoms preferably where the hydrocarbyl group is alkyl. Preferred materials are the alkanols and mixtures of the aforesaid compounds with the alkanols because of water solubility factors. The more preferred alkanols are those having between one and about six carbon atoms such as methanol, ethanol, propanol, isopropanol, butanol, sec.-butyl alcohols with acetone, formaldehyde, methyl ethyl ketone and the like. Of special preference is ethanol not only because of its extreme water solubility forming a solution in which sucrose nuclei readily form but because of its relatively low toxicity and non-poisonous characteristics. These properties are obvious importance in any food processing.

The sucrose feed syrup will be that produced from raw sugar cane or beet extract or juice. The syrup is such that a major amount of sucrose is present by weight, i.e., contains at least 50% by weight sucrose. Preferred sucrose concentrations are between about 60% and about 80% by weight and more preferably between about 65% and 70%. The syrup is essentially a sucrose-water composition and thus amounts of water are between about 20% and about 40% and preferably between about 30% and about 35% by weight. However, the feed syrup need not be limited to a binary composition. Thus, impurities normally found in the raw beet or cane extracts such as reducing sugars, ash, etc., which materials are normally left to form the molasses following sugar crystallization may be present.

The nuclei may also be produced in more purified sucrose concentrates where the impurities of the raw cane or beet extracts have been removed. Because of the relatively small volumes of ingredients used in producing the nuclei according to the present invention, and the high yield of single crystal nuclei formed which may be used to seed large sugar crystallization reactors, it may be preferred to use purified feed syrup concentrates consisting essentially of sucrose and water in the above-noted proportions.

The nuclei initiating composition is prepared by mixing the organic compound, which will be referred to hereinafter as ethanol, with the feed syrup in ciritical proportions. Generally, the amount of ethanol added to the feed syrup is to form a nuclei-producing composition having an ethanol:water weight ratio of between about 0.6:1 and about 3:1. Preferably the ethanol:water ratio is between about 1:1 and about 2.5:1. It has been found empirically that optimum nuclei production occurs in the presence of ethanol:water ratio between about 1.2:1 and 1.6:1 respectively.

The importance of achieving and maintaining the proper nucleation or nuclei-producing composition is critical due to the nature of the nuclei formation. Under proper conditions, the nucleation will occur essentially spontaneously and thereafter will so continue providing proper conditions are maintained. Greater amounts of ethanol yield more nuclei or a greater population density; concomitantly, nuclei production drops off with smaller amounts of ethanol so that at values below about 0.6:1 little or no nuclei are formed. However, as important as nuclei population density or concentrations yielded in production may be, of greater importance is the preparation of nuclei having a single crystal habit in which twinning, agglomerative, or multicrystal structures are avoided. It will be appreciated that crystallization on highly twinned, agglomerative or multicrystals, due to their irregular shapes and sizes, will produce poor and undesirable sugar crystals which have the shape characteristics of the nuclei.

In any given nuclei product where substantial if not major amounts of undesirable twinning or multicrystals are present there will be a great variation in the different sizes and shapes of the nuclei. In turn, there will be little or no control over size and shape variations of the final crystals grown on such nuclei. For this reason, it is imperative that single crystal nuclei be formed at the expense of lower population densities. However, it is to also be understood that at the single crystal nuclei formation concentrations, production rates of nuclei population densities are not to be considered by any means low but merely lower relative to amounts or nuclei densities produced at greater ethanol:water ratios.

The ethanol and syrup are mixed at ambient conditions although minor variations in temperature are not known to be particularly critical; however, temperature extremes such as composition boiling temperatures are to be avoided. Continued mixing is desirable in order to maintain composition homogeneity. The ingredients may be added to a reactor at one time, semicontinuously or continuously as desired with product removal similarly accomplished. Reaction times may vary between a few minutes to several hours, preferably between one and about two hours. Shorter reaction or retention times result in loss of yield as well as vessel fouling. In a continuous process time periods of up to about 15 and preferably between about 8 and 10 retention times are suitable for achieving a steady state condition. Retention times are intended to describe the mean time required for an ingredient sample to pass through the reactor under for an ingredient sample to pass through the reactor under normal continuous processing times and conditions. However, once the reaction vessel has been charged initially with a suitable ethanol-syrup mixture and stirring continued, desirable product is not obtained until steady state conditions are achieved. Thereafter continuous introduction of the ingredients and the product recovered will be essentially invariant in its characteristics.

It has also been found that the presence of small amounts of surfactant materials such as quaternary ammonium halides assist in reducing multicrystal formation. Thus, the presence of such materials in additive amounts will allow the use of greater amounts of ethanol thereby increasing product yield while still producing the desired single crystal formation.

The nuclei compositions produced by the process herein described are those in which a major amount of nuclei are of single-crystal structure. Using more preferred ethanol:water weight ratios, single crystal population is at least about 75% and up to approximately 99+%. Nuclei population density measured in nuclei per cubic centimeter of suspension per micron of particle size range between about 10,000 to about 300,000 with densities of between about 25,000 and about 100,000 at a crystal size of about ten microns are achieved in preferred compositions. Average particle size of the nuclei expressed as a mean population-weighted size will be between about 15 and about 25 microns with typical variations of individual nuclei in product samples being between about 1 and about 100 microns.

The following examples illustrate the manner in which the invention is carried out. It is to be understood that the examples are by way of illustration only and the invention is not to be limited to any specific materials or concentrations except as otherwise set forth herein. Unless otherwise expressed, parts and percents are given by weight.

Example I

A 3 liter crystallizer was fitted with a draft tube, with three baffles provided between the external side of the draft tube and the internal side of the vessel. Alcohol and syrup inlet feed lines were loctaed at the top of the vessel and product removal lines at the bottom. Ethanol (absolute) was introduced at a flow rate of 19.4 cc./min. continuously while syrup (67.9% sucrose, 32.1 water) was introduced at a rate of 25.4 cc./min. This composition corresponded to an ethanol:water ratio of 1.4:1. The vessel was maintained at ambient temperature of about 26° C. and the composition stirred at 900 r.p.m. with a turbine blade impeller. Product was withdrawn semi-continuously in response to a signal from a liquid level controller maintaining the liquid level in the vessel constant to 2.5 liters plus or minus 10%. These conditions were maintained for approximately 8 to 10 retention times after which size distribution of the sucrose crystals in product samples were found to have reached a steady state. The nuclei solids concentration was found to be 0.25 gram/cc. and the population-weighted mean particle size was 15 microns. Single crystal habit was exhibited by at least 95% of product nuclei crystals. A sample of product is shown in FIG. 1 which is an 85× enlargement showing representative crystals. The micro-photograph is of a dried sample which unavoidably contained small fragment particles produced in handling the sample.

A run substituting a 3:1 acetone-methanol mixture for the ethanol produced similar results.

Example II

Figure 2:
FIG. 2 is a micro-photograph of sugar nuclei produced by another method.

The procedure set forth in Example I was repeated except that the flow rate of ethanol was 26.0 cc./min. and the syrup was 18.8 cc./min. corresponding to an ethanol: water ratio of 2.5:1 respectively. The corresponding population-weighed mean particle size was found to be 15.5 microns with a population density of 250,000. FIG. 2 shows a 34× enlargement of some of the large crystals produced which are twinned or multicrystal. It was found that over 95% of the crystals were of twinned or multiple crystal habit.

As previously pointed out, the nuclei produced according to the invention are particularly useful in continuous sugar crystallization processes. The application in such a continuous process is realized because the nuclei composition production may be run continuously and the product used to seed a continuous sugar crystallization.

The feed syrup used in a commercial sugar crystallization process will generally be a concentrated sucrose composition such as previously described for the nucleation process. However, the high purity syrups are not practical. The amount of nucleating composition used to seed a sucrose syrup will be less than about 1:10,000 by weight respectively. On a continuous basis, respective flow ratios of about 1:2,000 (volume), for example, may be useful.

The following example illustrating a continuous process for preparing sugar crystals will also be better understood by referring to FIG. 3 which schematically illustrates the process.

Example III

A vessel reactor 10 was connected with two large crystallizers shown as 20 and 30 respectively in FIG. 3. Into the 13.5 liter reactor 10 was injected the reaction mixture. The concentrated sucrose solution consisting of 67.9% by weight sucrose and 32.1% water was introduced via line 12 at a rate of 137 cc./min. while 105 cc. ethanol/min. was introduced via line 15. The ingredients were continuous mixed by stirrer 13 at 900 r.p.m. Product crystals were withdrawn from the reactor 10 via line 16 and introduced into crystallizer 20 at a rate of about 3.78 kilogram/hour. The product characteristics were essentially the same as those described in Example I.

Feed syrup was introduced into crystallizer 20 via line 14 having the same composition of that introduced into reactor 10. The syrup was introduced at a rate of 112 gal./minute. The crystallizer 20 had a 10,000 gal. capacity and the ingredients were continuously mixed by stirrer 23. The retention time of the materials in crystallizer 20 was approximately 100 min. and the rate of slurry withdrawal (on a clear liquor basis) was 200 gal./min. via line 22 to classifier 26. Classifiers 26 and 36 were standard particle classifiers classifying at a cut size of 350 microns. Smaller crystals were returned to the crystallizer 20 via line 24 in a stream of recirculated liquor equal to 100 gal./min. whereas the product crystals meeting or exceeding the cut size were passed on to crystallizer 30 via line 28 in a slurry with flow (clear liquor basis) of 100 g.p.m. Water vapor from boiling is removed to a vacuum via line 40, which boiling brings about crystallization in 20. The average population crystal size leaving classifier 26 via line 28 was 118 microns while the average weight size was 354 microns.

The flow rate into crystallizer 30 from classifier 26 via line 28 was augmented to 112 g.p.m. with fresh feed introduced via line 43 with the speed of stirrer 33 and reaction conditions being essentially identical with those of crystallizer 20. Evaporated water to produce crystallization in 30 is removed via line 41 to a condensing vacuum system. Classifier 36 also classified at a cut size of 350 microns with smaller crystal particles being returned to crystallizer 30 via line 34 in a slurry stream of 100 gal./min. (clear liquor basis) while the product crystals attaining sufficient size are recovered via line 38. Slurry flow to classifier 36 is again about 200 gal./min. (clear liquor basis). Total product recovered was approximately 200 tons per day of sugar crystals having an average population size of 142 microns and a weight size of 364 microns. The coefficient of particle weight variation of the product was 0.360.

It should be appreciated that the above example does not necessarily represent optimum conditions for the continuous crystallization of sucrose. However, from the above example, it will be evident that the continuous preparation of a sucrose nucleating composition according to the invention is suitable for producing sugar crystals on a commercial and continuous basis. It will be noted that a relatively small continuous nuclei production reactor is sufficient to supply relatively large crystallizers with seed. Again, the nuclei produced according to the invention is not limited to use in a continuous reactor but may be used in a batch process where preparation of crystals having a relatively narrow size range is desired. This invention may be practiced in the crystallization, batch or continuous, of raw or refined sugar. These as well as other advantages will be evident to those skilled in the art.

We claim:

1. A sugar crystallization nucleating composition substantially free of invert sugar comprising sucrose nuclei a major amount of which nuclei are single crystals in a liquid polar organic compound-water medium wherein the ratio of said organic compound:water is between about 0.6:1 and about 3:1 by weight respectively, said organic compound being selected from the group consisting of aliphatic ethers, esters, ketones, alkanols and mixtures thereof and wherein the nuclei concentration expressed as population density in particles per cubic centimeter per micron is at least about 10,000 at ten microns size and wherein the population weighted mean size of nuclei is between about 10 and about 30 microns.

2. A composition of claim 1 wherein at least about 90% of the nuclei are single crystals.

3. A composition of claim 1 wherein the total nuclei concentration is at least about 100,000 nuclei per cubic centimeter.

4. A process for producing sugar crystals comprising adding to a sucrose syrup a small amount of the composition of claim 1.

5. A process of claim 4 wherein the sucrose syrup comprises a major amount of sucrose.

6. A process of claim 4 wherein the ratio of nucleating composition to syrup is less than about 1:10,000 respectively by weight.

7. A process of claim 4 wherein the nucleating composition and sucrose syrup are continuously injected into a vessel to yield a crystallization product.

8. A process of claim 7 comprising the additional steps of continuously recovering the crystallization product and supplying it to a second vessel to which fresh sucrose syrup is continuously injected.

9. A method of preparing a sugar crystallization nucleating composition having a major amount of single crystal sucrose nuclei comprising adding a low molecular weight polar organic compound selected from the group consisting of aliphatic ethers, esters, ketones, alkanols and mixtures thereof to a sucrose feed syrup having a substantially no solid phase sucrose and comprising between about 60 and 80% by weight sucrose and about 20 and about 40% by weight water and wherein the amount of organic compound added is sufficient to form an organic compound:water weight ratio of between about 0.6:1 and about 3:1 respectively, mixing the composition and recovering the resulting product.

10. A method of claim 9 wherein the organic compound contains between about 1 and about 8 carbon atoms.

11. A method of claim 9 wherein the organic compound is an alkanol of between 1 and about 6 carbon atoms.

12. A method of claim 9 wherein said sucrose feed syrup is substantially free of invert sugar.

13. A method of claim 9 wherein the organic compound is ethanol.

14. A method of claim 13 wherein the ratio of ethanol:water is between about 1:1 and about 2:1 respectively.

15. A method of claim 13 wherein the ratio of ethanol:water is between about 1.2:1 and about 1.6:1 respectively.

16. A continuous process for producing a sugar crystallization nucleating composition comprising adding to a first reactor a sufficient amount of ethanol to a sucrose syrup having substantially no solid phase sucrose and comprising between about 60 and about 80% sucrose and between about 20 and about 40% water by weight to form a mixture wherein the ethanol:water ratio by weight is between about 1.2:1 and about 1.6:1, mixing such feeds into the reactor until steady state conditions are achieved and thereafter recovering the resulting product.

References Cited

A. F. J. Appelboom, Jr., International Sugar Journal, 58, 99–101 (1956).

MORRIS O. WOLK, Primary Examiner

S. MARANTZ, Assistant Examiner

U.S. Cl. X.R.

23—301; 127—60